United States Patent [19]

Golwas et al.

[11] Patent Number: 4,702,650
[45] Date of Patent: Oct. 27, 1987

[54] POSITIVE FEED DRILL USE COUNTER

[75] Inventors: Robert F. Golwas, San Demas, Calif.; Robert A. Pennison, Bellville; Richard E. Eckman, Houston, both of Tex.

[73] Assignee: Dresser Industries, Inc., Dallas, Tex.

[21] Appl. No.: 763,846

[22] Filed: Aug. 8, 1985

[51] Int. Cl.$^4$ ............................................. B23B 49/00
[52] U.S. Cl. ........................................ 408/6; 408/11; 408/16; 408/702
[58] Field of Search .................. 408/5, 6, 8, 9, 10, 408/11, 16, 17, 702

[56] References Cited

U.S. PATENT DOCUMENTS

| 2,397,974 | 4/1946 | Morrow et al. | 408/11 |
| 3,264,873 | 8/1966 | Svenson | 408/16 |
| 4,123,187 | 10/1978 | Turner | 408/137 |
| 4,473,329 | 9/1984 | Aoshima et al. | 408/16 |
| 4,507,834 | 4/1985 | Chen et al. | 408/16 |

Primary Examiner—Gil Weidenfeld
Assistant Examiner—Daniel W. Howell

[57] ABSTRACT

A positive feed drill assembly having an air powered motor and an automatic drill feed and retract mechanism with a normal feed, drill, and retract sequence of operation is provided with an improvement to control the number of times the drill can be used to make a hole with a particular cutter. The improvement includes an apparatus associated with the automatic feed and retract mechanism for sensing the cycle of each drilling operation. A counter functioning with the sensing apparatus counts the number of drilling operations. A comparator associated with the counter compares the accumulated number of drilling operations with a predetermined number. A signaling apparatus connected with the counter provides a signal to the operator when the drill assembly has performed the maximum number of drilling operations for that cutter so the operator can replace the cutter before using the drill assembly again.

5 Claims, 9 Drawing Figures

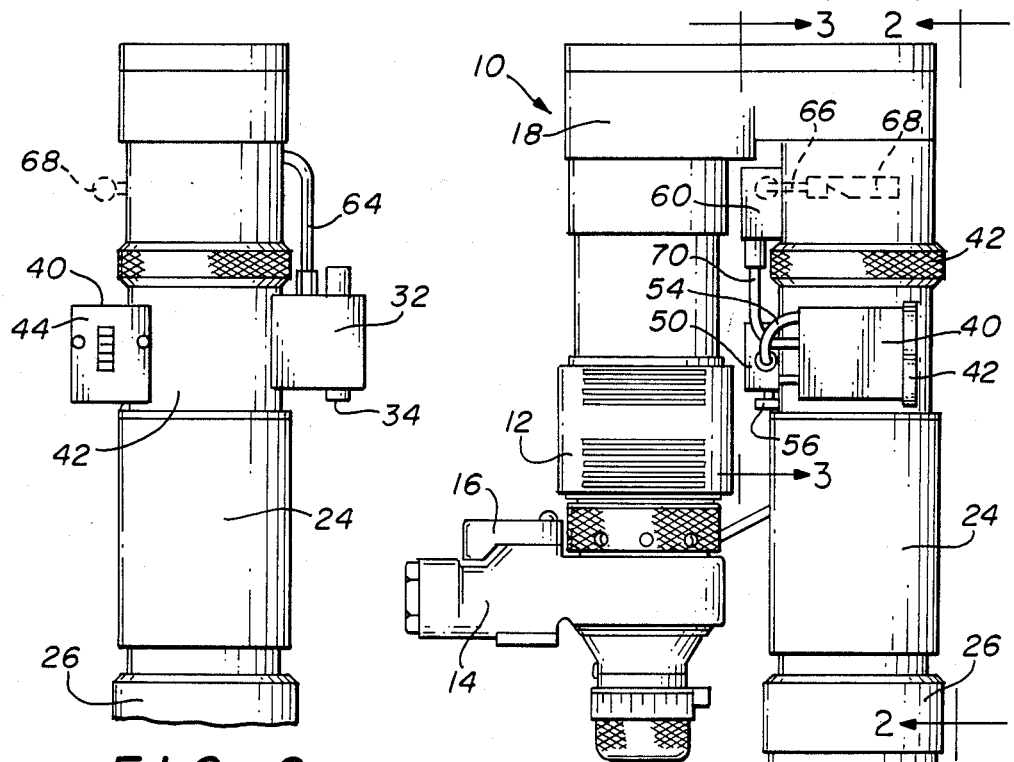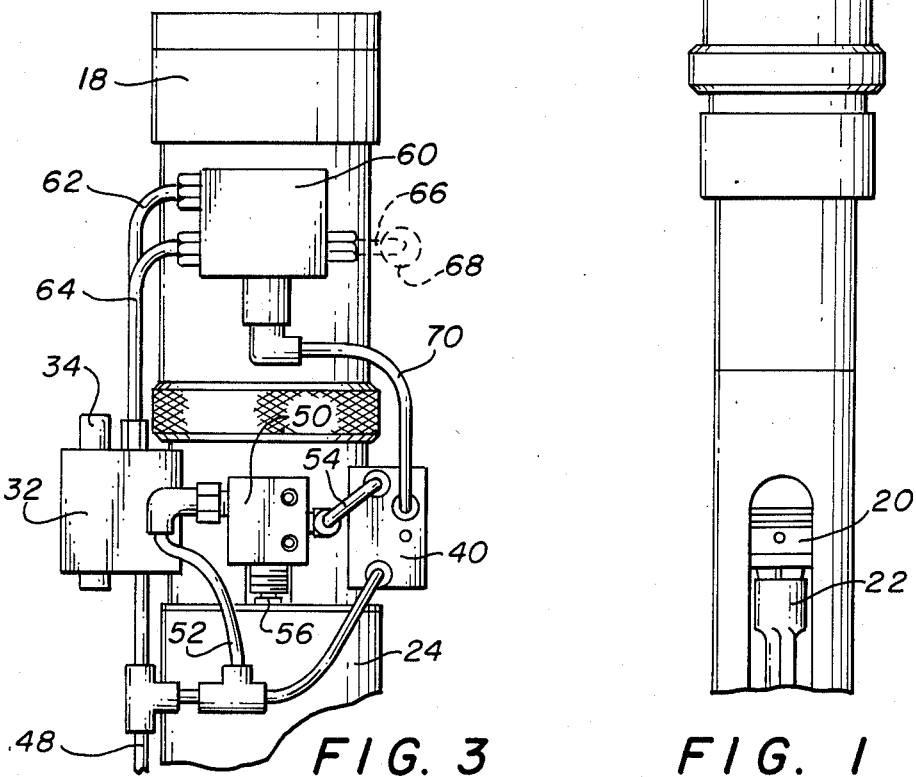

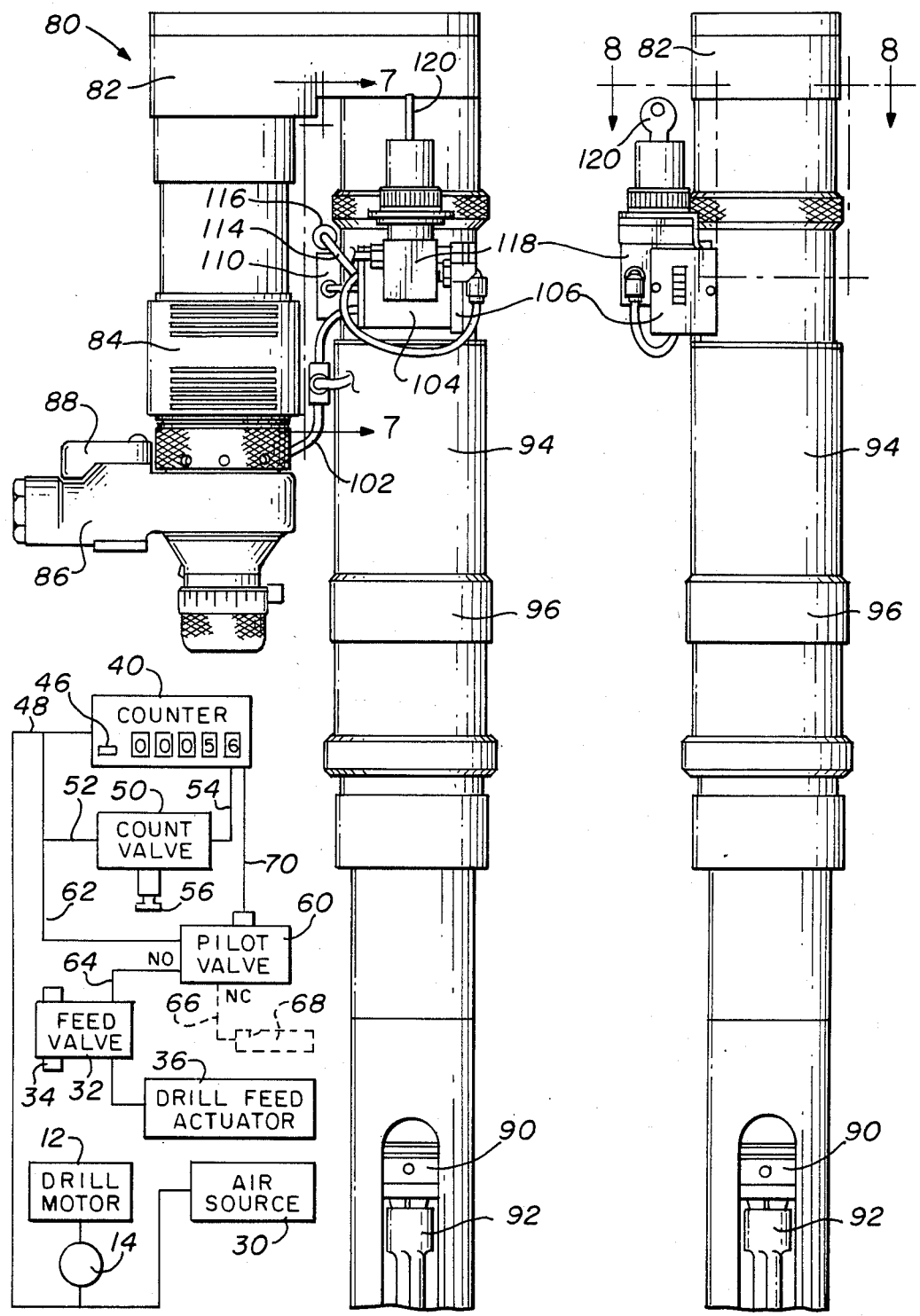

POSITIVE FEED DRILL USE COUNTER

TECHNICAL FIELD

This invention is related to control systems for air powered positive feed portable drills. More particularly, this invention is related to devices for such drills that limit the number of drilling operations that can be performed with a drill before the cutter must be changed.

BACKGROUND OF THE INVENTION

Portable air powered positive feed drills are used in industry to produce accurately placed and dimensioned holes in workpieces. One application of this type of drill is in the aircraft industry where the holes formed in the various aircraft parts must be located and drilled very accurately, often to within a tolerance of one-half of one-thousandth of an inch. In order to produce these accurate holes, it is necessary that the dimensions of the drill's cutter also be quite accurate. Once the cutter begins to dull, the dimensional tolerance of the hole it is producing can be exceeded solely because of deterioration of the cutter surface. In order to prevent this inaccuracy, it is a normal practice to change the drill cutters at regular intervals. However, it has been observed that where quantity production must be maintained operators may continue to use cutters that should be replaced, thereby completing a workpiece with holes, counterbores, and the like that are out of dimensional tolerance.

This invention provides a simple drill operation limiting device that signals an operator that the drill cutter should be changed. One embodiment of this invention prevents continued operation of the drill by blocking air flow to the air powered feed and retraction mechanism. Another embodiment of the invention provides an audible alarm in the form of a whistle that blows anytime the number of drilling operations has been exceeded.

SUMMARY OF THE INVENTION

A typical air powered positive feed drill includes an air powered motor coupled with an automatic drill feed and retraction mechanism to feed and retract a cutter in a normal drilling sequence. The improvement of this invention controls the number of times the drill assembly is used to complete a drilling operation with a particular cutter. The control includes a device associated with the automatic feed and retraction mechanism to sense the completion of a drilling operation or drilling cycle. A counter device operable with the sensing device counts the number of drilling operations. A comparator associated with the counter compares the counted number of drilling operations with a predetermined number. A device to signal an operator is connected with the counter and comparator to notify the operator that the drill has performed the maximum number of drilling operations for the cutter mounted therewith. In one embodiment of the invention for use with drills having an air powered automatic drill feed and retraction mechanism, the air supply to this mechanism is interrupted to prevent continued operation of the drill. In another embodiment of the invention adapted for use with drills having mechanically hand engaged automatic drill feed and retraction mechanisms, a whistle is provided that sounds anytime the drill is connected to an air supply.

One object of this invention is to provide a cutter use signaling device for air powered portable drills to notify an operator that the drill's cutter must be replaced in order to maintain dimensional tolerances of the holes being produced.

Another object of this invention is to provide a signaling device for air powered portable positive feed drills that prevents continued operation of the drill once the cutter has been used a predetermined number of times.

A further object of this invention is to provide a drill signaling device for air powered portable positive feed drills that will signal an operator that the drill's cutter has been used a predetermined number of times and should be changed before the drill is used again.

Various other objects, advantages, and features of this invention will become apparent to those skilled in the art from the following discussion, taken in conjunction with the accompanying drawings, in which:

DESCRIPTION OF THE DRAWINGS

FIG. 1 is an elevation side view of a portable air powered positive feed drill with an air powered automatic drill feed and retraction mechanism and with the workpiece mounting portion thereof removed;

FIG. 2 is a side elevation view of a portion of the drill shown in FIG. 1, with the view taken along lines 2—2 thereof;

FIG. 3 is an elevation view of the opposite side portion of the drill segment shown in FIG. 2, with the view taken along lines 3—3 of FIG. 1;

FIG. 4 is a schematic block diagram of the control system of this invention as applied to the drill shown in FIG. 1;

FIG. 5 is an elevation side view of a portable air powered positive feed drill having a mechanically and hand engaged automatic drill feed and retraction mechanism with an embodiment of the control system of this invention connected thereto, and with the workpiece mounting portion removed;

FIG. 6 is a side elevation view of the drill shown in FIG. 5 taken from the right side thereof;

Figure 7:
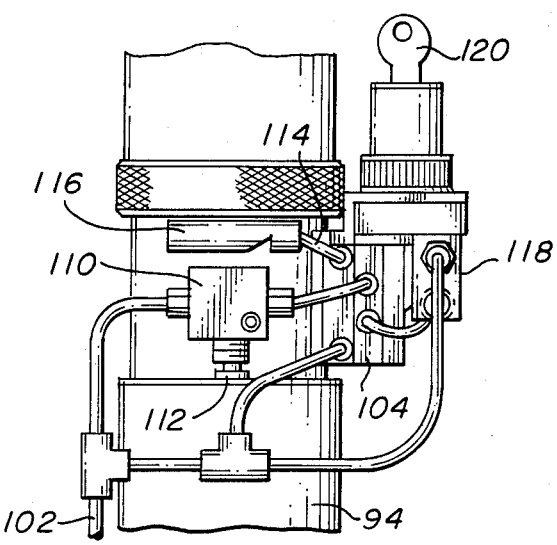
FIG. 7 is an elevation view of a portion of the drill as shown in FIG. 5 with the view taken along lines 7—7 thereof.
Figure 8:
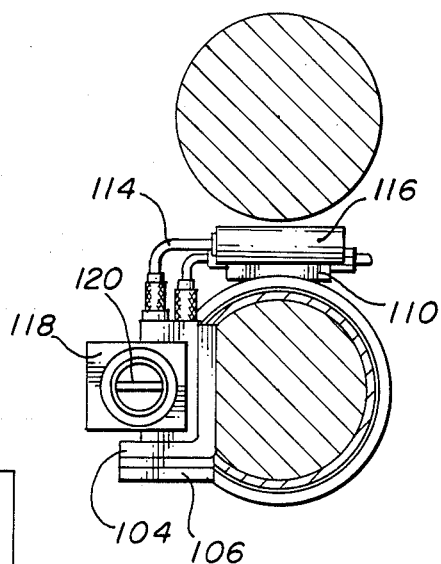
FIG. 8 is a cross-section of the control system of the drill taken along lines 8—8 of FIG. 6.

The following discussion and description of preferred specific embodiments of the drill control system of this invention is made with reference to the drawings, wherein the same reference numerals are used to indicate the same or similar parts and/or structure. It is to be understood that the following discussion and description is not intended to unduly limit the scope of this invention.

DETAILED DESCRIPTION

Referring to FIG. 1 of the drawings, an air powered positive feed portable drill with an air powered automatic drill feed and retraction mechanism is indicated generally by reference numeral 10. This drill includes an air motor 12 mounted with the drill housing and operably connected through appropriate gearing to rotate the drill spindle. Air motor 12 is connected to a driving source of air from a supply through a main air valve 14 having an actuator level 16. As shown, the drill is constructed in two major portions: a motor portion and a spindle and feed portion connected and enclosed within a drill housing 18.

The automatic drill feed and retraction mechanism is contained within the right hand portion of the drill housing as shown in FIG. 1. This mechanism is connected to the drill spindle upon which is mounted a drill chuck 20 and an associated cutter 22. A portion of the automatic drill feed and retraction mechanism includes a shifting sleeve 24 shown positioned above a shifting collar 26. Shifting sleeve 24 normally resides in the position shown and, at the end of the drilling stroke before the spindle and drill chuck 20 are moved to the retract position, sleeve 24 moves downward a short distance and then returns to the position shown.

Now referring to FIGS. 1-4 inclusive, a cooperative function of this embodiment of the invention will be described. During normal operation, the drill is first mounted with the workpiece by using a tooling plate, not shown, as is well known in the art. The drill is connected to a compressed air source 30 and main air valve 14 is opened, thereby enabling drill motor 12 to operate. For the air powered automatic drill feed and retraction mechanism to begin operation, feed valve 32 is opened by displacing feed valve actuator sliding member 34, which passes air into air powered automatic drill feed and retraction mechanism 36. This action initiates the feeding and drilling movement of the drill's spindle and associated chuck 20 and cutter 22. The drilling operation continues at a normal cycle by positively advancing the rotating cutter 22 until the desired depth has been reached, at which point the drill mechanism retracts the spindle. At the end of the drill stroke cycle shifting sleeve 24 is displaced downward and back upward as described above.

A counter assembly 40 is mounted to the drill housing on a housing segment 42 above shifting sleeve 24. Counter 40 is a numerical digital air pulse counting device adapted to count down from a preset number to zero and then open an internal valve providing communication between an inlet and an outlet thereof. Counter 40 is provided with a face cover 44 mounted over a dial portion and a manual reset button 46. Counter face cover 44 is removably mounted on the counter by fasteners to protect the counter dial and prevent unauthorized tampering with the counter's numerical setting or the reset button 46. Counter 40 is connected by a conduit 48 to air source 30.

A count valve 50 is a normally open valve having an inlet connected by conduit 52 to air supply conduit 48 and having an outlet connected by conduit 54 to the air pulse inlet of counter 40. Count valve 50 has the valve member thereof connected to a plunger count valve actuator member 56. Count valve 50 is mounted with the drill housing 18 and positioned with its actuator member 56 located in a retracted position touching the upper rim portion of shifting sleeve 24 so the valve is closed. When shifting sleeve 24 moves downward at the end of the drilling stroke portion of the drilling operation count valve actuator 56 is then moved downward to open count valve 50 and pass a pulse of air to counter 40.

A normally opened pilot valve 60 provides a valve assembly to interrupt the normal flow of air between air source 30 and feed valve 32 when further operation of the drill is to be prevented. Normally opened pilot valve 60 has an inlet connected by conduit 62 to air supply conduit 48. Normally opened pilot valve 60 has the normally opened outlet thereof connected by conduit 64 to the inlet of feed valve 32. The normally closed outlet of pilot valve 60 is shown connected by conduit 66 to a whistle 68 in the dash lines of FIG. 4. The pilot inlet of normally opened pilot valve 60 is connected by conduit 70 to the outlet of counter 40. In operation, when counter 40 reaches a zero count, the inlet and outlet thereof are connected, thus passing compressed air from air source 30 through the counter to the pilot inlet of valve 60, closing the normally opened outlet and opening the normally closed outlet. When this occurs, air flow continues through counter 40 until it is reset. This maintains pilot valve 60 in the shifted condition blocking further air flow to feed valve 32 and into the air powered drill feed actuator 36.

At the option of the user, whistle 68 can be attached to the normally closed outlet of pilot valve 60 to provide a shrill audible indication that the tool has completed the allowable number of drilling operations and should have the cutter replaced. Whistle 68 and its connecting conduit 66 are shown in dash lines indicating their presence being optional.

In order to reinitiate operation of the drill, counter cover 44 must be removed and the counter reset from zero to a predetermined number by an authorized person. Counter cover 44 is attached to the counter by fasteners which render the counter not easily accessible to a normal drill operator in a manufacturing operation. In normal manufacturing processes, the drill will be removed from the assembly line and returned to the tool storage and maintenance facility so that the counter can be reset and the drill's cutter replaced.

Referring now to FIGS. 5-9 of the drawings, another embodiment of the drill control system of this invention is illustrated. The air powered positive feed portable drill 80 is provided with a mechanically hand engaged automatic feed and retraction mechanism. This drill has the same general outward appearance as the drill described above and includes a housing upon which is mounted an air powered drill motor 84 and associated main air valve 86 with its actuating lever 88. The motor is connected through gearing and the like contained in the housing to provide rotation, feed, and retraction of the drill's spindle, chuck 90, and attached cutter 92. Shifting sleeve 94 resides in a normal position against collar 96 and is moved briefly at the end of the retraction cycle as described above. In order to engage the automatic drill feed and retraction mechanism of this drill, shifting sleeve 94 is rotated by hand after the drill motor 84 is started in order to operationally engage and start this mechanism. Once initiated, the function of feeding spindle, chuck 90, and cutter 92 toward a workpiece, as well as the retraction thereof, is the same as that described above.

Referring to the group of FIGS. 5-9, the several components of this embodiment will be described. Air source 100 is connected to drill motor air valve 86 and also to air supply conduit 102. Counter 104 is the same as that described above with the inlet thereof communicably connected to air source supply conduit 102. A cover 106 is removably mounted over the face of the counter 104, covering the dial and reset button 108.

Figure 9:
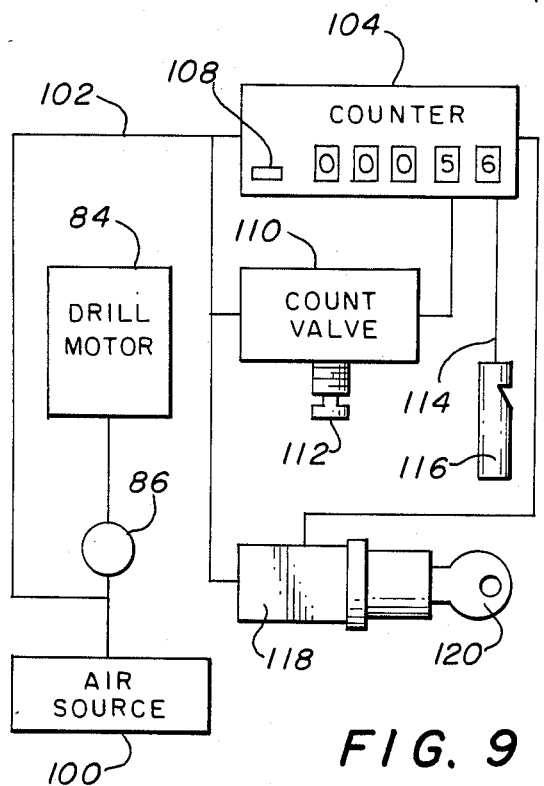
FIG. 9 is a schematic block diagram of the control system for the embodiment of the invention shown mounted with the drill in FIGS. 5-8.

Count valve 110 has an inlet communicably connected to air source supply conduit 102 and an outlet connected to the air pulse inlet of counter 104. Count valve actuator member 112 is normally extended as shown in FIG. 9 with count valve 112 being closed. During operation of the drill assembly, when shifting sleeve 94 moves downward count valve actuator member 112 is moved downward opening count valve 110 and passing an air pulse to the pulse air inlet of counter 104.

During successive operation of drill 80, counter 104 counts down from a predetermined value to zero. When the zero count is reached the air outlet of counter 104 is opened and air is passed through conduit 114 to whistle 116. At this point in the operation of the drill, air will be passed from air source 100 through conduit 102 and counter 104 to whistle 116, thereby signaling the drill operator that the drill's cutter has been used the requisite number of times and the drill should be removed from service for replacement of the cutter. Because drill 80 is provided with a mechanically hand engaged automatic drill feed and retraction mechanism, the drill can continue to be used. However, whistle 116 will provide a constant reminder that the drill is operating with a cutter that should be removed from service.

In order to reset counter 110, a locked reset valve 110 is provided. This locked reset valve requires a key 120 for operation. In a manufacturing operation the key should retained by a supervisor or by drill equipment maintenance personnel to assure that the cutter is changed before drill operation is continued. Valve 118 is a normally closed valve that can be opened by use of the key with the valve's associated locking mechanism. When valve 118 is opened, a pulse of air is delivered to a reset inlet of counter 104, thereby resetting the counter to its initial predetermined value. The use of locked reset valve 118 in this system has an advantage for uses wherein the drill cutter need only be inspected after a predetermined number of drilling operations. In this instance cutter 92 can be inspected with the drill mounted on a tooling plate and the counter can be reset by a key operator to resume work.

If desired by the user, reset valve 118 and its associated lock can be eliminated from the system so that counter 104 can be reset manually by removal of cover 106. In the situation where reset valve 118 is removed, the drill would have to be removed from service for resetting the counter. Regardless of which counter resetting steps are followed, the drill's cutter 92 should be inspected, or sharpened, or replaced before placing the drill in service again.

Although specific preferred embodiments of this invention have been described in detail in the preceding description, this description is not intended to limit the invention to the particular form or embodiments disclosed herein since they are to be recognized as illustrative of the invention rather than restrictive.

Thus, the invention is declared to cover all changes and modifications of the specific examples of the invention herein disclosed for purposes of illustration which do not constitute departures from the spirit and scope of the invention.

What is claimed is:

1. In a pneumatic drill assembly having an air powered motor and an automatic drill feed and retraction mechanism, an improvement comprising a means for limiting the number of times the drill assembly is used to bore holes with a particular cutter, including:
   means associated with the automatic feed and retraction mechanism for sensing the completion of a drilling operation;
   means associated with said sensing means for counting the number of drilling operations, said counting means comprising a digital counter receiving an input signal from said sensing means, a counter mechanism operable to count down from a predetermined number to zero, and a means for transmitting an output signal upon a zero count;
   an air pulse valve comprising a valve member for receiving inputs from said sensing means and providing output air pulses to said counting means, said counter mechanism counting down one count for each air pulse received from said air pulse valve; and
   a reset control valve having a normally open pneumatic valve operably connected to said counter means for receiving said output signal to close said normally open pneumatic valve, thereby preventing further normal operation of said automatic drill feed and retraction mechanism.

2. The improvement of claim 1, further comprising a means for signaling upon receipt of said output signal, said signaling means comprising:
   an audible whistle; and
   a key operated reset means for resetting said counter mechanism.

3. In a positive feed drill assembly having an air powered motor and an air powered automatic drill feed and retraction mechanism having a normal feed, drill, and retract sequence of drilling operation, an improvement comprising a means for controlling the number of times the drill is used to make a hole with a particular cutter, including:
   a motor air flow control valve connected to supply driving air to the motor;
   means associated with the automatic feed and retraction mechanism for sensing the completion of a drilling operation;
   means associated with said sensing means for counting the number of drilling operations;
   an air pulse valve having an outlet connected to said counting means for supplying a pulse of air to increment said counting means upon completion of each drilling operation;
   means associated with said counting means for comparing the total number of drilling operations with a predetermined number;
   means operably connected with said counting means for signaling that the drill assembly has performed the predetermined number of drilling operations for the particular cutter;
   means connected between the motor and said signaling means for interrupting the flow of air to the motor to prevent further normal operation of the drill assembly; and
   said means for interrupting including a normally open pilot operated control valve having a pilot inlet operably connected to said signaling means, an inlet connected to a source of driving air, and an outlet connected to the automatic feed and retraction mechanism to supply driving air thereto, said control valve being closable upon an air signal to said pilot inlet from said signaling means.

4. In a positive feed drill assembly having an air powered motor and a mechanical hand engaged automatic drill feed and retraction mechanism having a normal feed, drill, and retract sequence of drilling operation, an improvement comprising a means for controlling the number of times the drill is used to make a hole with a particular cutter, including:

means associated with said automatic feed and retraction mechanism for sensing the completion of a drilling operation;

means associated with said sensing means for counting the number of drilling operations;

means associated with said counting means for comparing the total number of drilling operations with a predetermined number;

means operably connected with said counting means for signaling that the drill assembly has performed the predetermined number of drilling operations for the particular cutter;

an audible whistle alarm actuatable by said signaling means;

a count pulse control valve comprising a valve member movable between open and closed positions, an inlet connected to a supply air source, and an outlet connected to said counting means, said valve member being movable from said closed position to said open position by said drill feed and retract mechanism when a drilling operation is completed in order to increment said counting means one count for each pulse received from said count pulse control valve;

said counting means contained in an enclosure to prevent unauthorized resetting of said counting means after said signaling means actuates said whistle; and means for resetting said counting means including a key operated valve having an inlet connected to said air supply source and an outlet connected to said counting means and being operable to reset said counting means to said predetermined number.

5. A pneumatic drill assembly having an automatic feed and retract mechanism, comprising:

means for sensing the completion of a drilling operation;

means associated with said sensing means for counting the number of drilling operations for a particular cutter, said counting means including a counter mechanism operable to count down from a predetermined number to zero;

an air pulse valve for receiving inputs from said sensing means and providing output air pulses to said counting means, said counter mechanism counting down one count for each air pulse received from said air pulse valve;

means associated with said counting means for signaling when said counter mechanism reaches zero;

a control valve responsive to said signaling means for preventing further pneumatic operation of the drill assembly; and means for resetting said counter mechanism and said control valve after replacing the particular cutter with a new cutter.

* * * * *